(12) United States Patent
Liu et al.

(10) Patent No.: US 12,254,274 B2
(45) Date of Patent: Mar. 18, 2025

(54) TEXT CLASSIFICATION METHOD AND TEXT CLASSIFICATION DEVICE

(71) Applicant: Telefonaktiebolaget LM Ericsson (publ), Stockholm (SE)

(72) Inventors: Feng Liu, Beijing (CN); Mengmeng Liu, Beijing (CN); Zhiming Zhang, Beijing (CN); Nan Liang, Beijing (CN); Jiawei Xu, Beijing (CN); Zhentao Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 388 days.

(21) Appl. No.: 17/802,349

(22) PCT Filed: Nov. 19, 2020

(86) PCT No.: PCT/CN2020/130102
§ 371 (c)(1),
(2) Date: Aug. 25, 2022

(87) PCT Pub. No.: WO2021/189881
PCT Pub. Date: Sep. 30, 2021

(65) Prior Publication Data
US 2023/0139663 A1    May 4, 2023

(30) Foreign Application Priority Data
Mar. 25, 2020    (CN) .......................... 202010221049.5

(51) Int. Cl.
*G06V 30/19* (2022.01)
*G06F 40/30* (2020.01)
(Continued)

(52) U.S. Cl.
CPC ............ *G06F 40/30* (2020.01); *G06V 30/153* (2022.01); *G06V 30/18* (2022.01);
(Continued)

(58) Field of Classification Search
CPC .............. G06F 40/30; G06V 30/19107; G06V 30/153; G06V 30/18; G06V 30/274; G06V 30/19093; G06V 30/19173
(Continued)

(56) References Cited

U.S. PATENT DOCUMENTS 10,540,610 B1    1/2020 Yang et al.
11,281,860 B2 *  3/2022 Yue ........................ G06F 40/279
(Continued)

FOREIGN PATENT DOCUMENTS

CN    108170773 A    6/2018
CN    108427720 A    8/2018
(Continued)

*Primary Examiner* — Allen H Nguyen
(74) *Attorney, Agent, or Firm* — Murphy, Bilak & Homiller, PLLC (57) ABSTRACT

Disclosed is a text classification method and a text classification device. The text classification method includes: receiving text data (S1), the text data comprising one or more text semantic units; replacing the text semantic unit with a corresponding text keyword (S2), based on a correspondence between text semantic elements and text keywords; extracting, with a semantic model, a semantic feature of the text keyword (S3); and classifying, with a classification model, the text keyword at least based on the semantic feature, as a classification result of the text data (S4).

14 Claims, 5 Drawing Sheets

(51) Int. Cl.
    *G06V 30/148*     (2022.01)
    *G06V 30/18*     (2022.01)
    *G06V 30/262*     (2022.01)

(52) U.S. Cl.
    CPC .. *G06V 30/19093* (2022.01); *G06V 30/19107* (2022.01); *G06V 30/19173* (2022.01); *G06V 30/274* (2022.01)

(58) Field of Classification Search
    USPC .......................................................... 382/229
    See application file for complete search history.

(56) References Cited

U.S. PATENT DOCUMENTS

| | | | |
|---|---|---|---|
| 11,580,144 B2* | 2/2023 | Galitsky | G06F 16/3331 |
| 12,159,251 B2* | 12/2024 | Ekmekci | G06V 10/443 |
| 2017/0220678 A1* | 8/2017 | Wren | G06F 40/30 |
| 2020/0125574 A1* | 4/2020 | Ghoshal | G06F 3/0484 |
| 2020/0327008 A1* | 10/2020 | Singh | G06F 9/451 |
| 2020/0371754 A1* | 11/2020 | P K | G06F 40/56 |

FOREIGN PATENT DOCUMENTS

| | | |
|---|---|---|
| CN | 108536870 A | 9/2018 |
| CN | 109840157 A | 6/2019 |
| CN | 110232128 A | 9/2019 |
| CN | 110532354 A | 12/2019 |
| CN | 109947947 B | 11/2021 |
| JP | 2008234519 A | 10/2008 |
| WO | 2019194343 A1 | 10/2019 |

\* cited by examiner

TEXT CLASSIFICATION METHOD AND TEXT CLASSIFICATION DEVICE

TECHNICAL FIELD

The present disclosure generally relates to a field of text processing. Particularly, the present disclosure relates to a method and a device capable of performing text classification in an efficient, high-accurate, robust, and automatic manner.

BACKGROUND

There are many ways to process text data. Processing text data manually has the problems such as high cost, low efficiency, and inconsistent standards. Processing text data in a rule-based manner by a computing device has the problems such as low flexibility, limited application, and insufficient accuracy. Processing text data in an Artificial Intelligence (AI)-based manner by a computing device requires a large amount of labeled training data for training.

For example, in the field of automatic testing, the testing of software and/or hardware is usually automated, which will result in a large number of test logs, giving rise to the need for automatic analysis of the test logs. For example, the test logs are classified into categories such as "Passed" and "Failed", or for a test log with the category "Failed", an error category is identified, classification is performed based on the error categories. The current test log processing includes processing, such as synthesizing error messages from a failed log, locating a root-related line in a failed log, and identifying an error. Among them, it is still required to synthesize the error messages from the failed log manually, or to locate the root-related line in the failed log manually; and the error identification is based on rules. Therefore, there are drawbacks in the manual and rule-based manner as described previously.

Therefore, a method and a device that may perform text classification in an efficient, high-accurate, robust and automatic manner are desired.

SUMMARY

A brief overview of the present disclosure is given below in order to provide a basic understanding of certain aspects of the present disclosure. It should be understood that the overview is not exhaustive, and is neither intended to determine essential or important parts of the present disclosure, nor to limit the scope of the present disclosure. Its purpose is merely to present some concepts in a simplified form as a prelude to the more detailed description that will be discussed later.

The present disclosure intends to use artificial intelligence technology to overcome the shortcomings of manual and rule-based methods. The present disclosure achieves at least one of purposes of reducing the need for labeled training data, improving accuracy of classification, and reducing model complexity by at least one of operations of using a text semantic unit as a unit for processing, generalizing the text semantic unit into a text keyword, etc.

In order to achieve one or more of the above objectives, according to one aspect of the present disclosure, a text classification method is provided. The method includes: receiving text data, the text data including one or more text semantic units; replacing the text semantic unit with a corresponding text keyword, based on a correspondence between text semantic elements and text keywords; extracting, with a semantic model, a semantic feature of the text keyword; and classifying, with a classification model, the text keyword at least based on the semantic feature, as a classification result of the text data.

According to another aspect of the present disclosure, a text classification device is provided. The device includes: a memory having instructions stored thereon; a processor coupled to the memory, wherein the instructions stored on the memory, when executed by the processor, cause the processor to: receive text data, the text data including one or more text semantic units; replace the text semantic unit with a corresponding text keyword, based on a correspondence between text semantic elements and text keywords; extract, with a semantic model, a semantic feature of the text keyword; and classify, with a classification model, the text keyword at least based on the semantic feature, as a classification result of the text data.

In addition, according to another aspect of the present disclosure, a storage medium is also provided. The storage medium includes a machine-readable program code which, when executed on an information processing device, causes the information processing device to perform the above method according to the present disclosure.

In addition, according to another aspect of the present disclosure, a program product is also provided. The program product includes machine-executable instructions which, when executed on an information processing device, cause the information processing device to perform the above method according to the present disclosure.

BRIEF DESCRIPTION OF THE DRAWINGS

The above and other objectives, features and advantages of the present disclosure will be more easily understood with reference to the following description of the embodiments of the present disclosure in conjunction with the accompanying drawings. The components in the drawings are only to illustrate principles of the present disclosure. In the drawings, the same or similar technical features or components will be represented by the same or similar reference signs. In the drawings.

DETAILED DESCRIPTION

Hereinafter, exemplary embodiments of the present disclosure will be described in detail with reference to the accompanying drawings. For the sake of clarity and conciseness, not all features of actual implementations are described in the specification. However, it should be understood that in the process of developing any of such actual implementations, many decisions specific to implementations must be made in order to achieve a specific goal of a developer, for example, compliance with constraints regarding a system and business, and these constraints may vary depending on the implementations. In addition, it should also be understood that although a development work may be relatively complicated and time-consuming for those skilled in the art benefiting from the present disclosure, such development work is only a routine task.

Here, it should be noted that, in order to avoid obscuring the present disclosure due to unnecessary details, only apparatus structures and/or processing steps closely related to the solution according to the present disclosure are shown in the drawings, and other details less closely related to the solution are omitted. In addition, it should be pointed out that the elements and features described in one figure or one embodiment of the present disclosure may be combined with the elements and features shown in one or more other figures or embodiments.

The flow of a text classification method according to an embodiment of the present disclosure will be described below with reference to FIG. 1.

Figure 1:
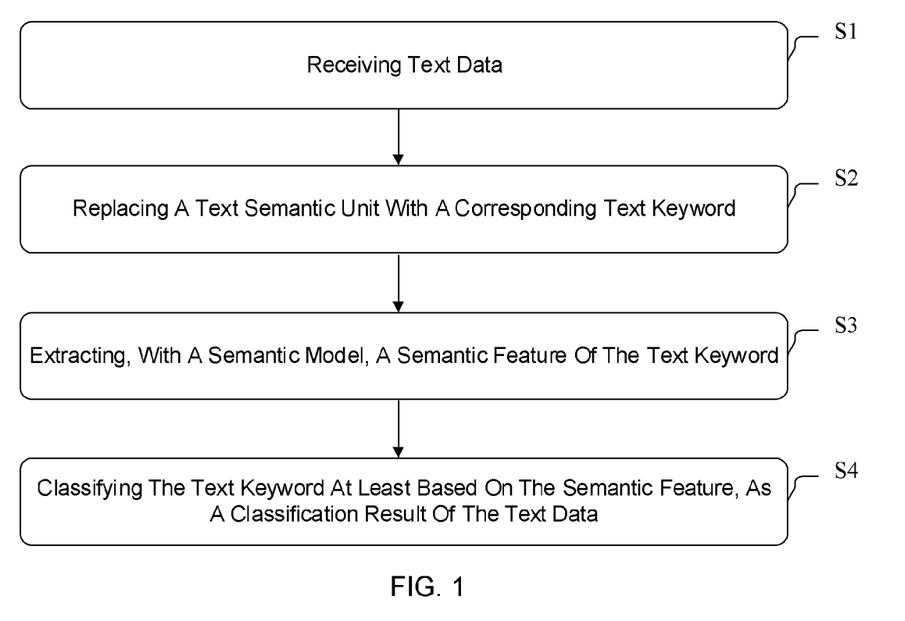
FIG. 1 illustrates a flowchart of a text classification method 100 according to an embodiment of the present disclosure.

FIG. 1 illustrates a flowchart of a text classification method 100 according to an embodiment of the present disclosure. As shown in FIG. 1, the method includes the steps of: receiving text data, the text data including one or more text semantic units (step S1); replacing the text semantic unit with a corresponding text keyword, based on a correspondence between text semantic elements and text keywords (step S2); extracting, with a semantic model, a semantic feature of the text keyword (step S3); and classifying, with a classification model, the text keyword at least based on the semantic feature, as a classification result of the text data (step S4).

The text data that may be processed by the present disclosure includes text data of various categories and in various languages, such as English test logs. Hereinafter, an English test log is taken as an example of the text data, but the present application is not limited to this.

Before step S1 or step S2, the text data needs to be subjected to data preprocessing.

The data preprocessing includes, but not limited to, at least one of: word segmentation, data cleaning, and conversion of text into a specific format.

In a case where the text data is Chinese, the word segmentation is performed. Since English itself has spaces as word segmentations, there is no need to segment the pure English text data. The text data in other languages is similarly segmented as needed.

The purpose of data cleaning is to remove a word that is irrelevant to the semantic of the text data. For example, for a test log, objects that need to be cleaned include, but not limited to, the following parameters: a ID (Identification), a date, an IP (Internet protocol) address, a file path, etc.

In step S1, the text data is received, which includes one or more text semantic units.

Traditional processing on natural language is generally performed in a unit of word/phrase, while the text processing of the present disclosure is performed in a unit of text semantic unit. A text semantic unit is a basic semantic unit of text to be processed, such as a phrase, a single sentence, multiple sentences, a text line (including a whole sentence, a continuous sentence), a paragraph, etc. In a scenario where the text data is an English test log, the text semantic unit is, for example, a log line, that is, one line in the test log, and the log line includes one or more sentences. All of the sentences included in the log line are complete sentences, not incomplete sentences. That is, there is no such a case that one sentence is distributed in multiple log lines. The log line is selected as a processing unit because: 1) the tester, when analyzing the log, takes a log line as a basic unit; and 2) the log line may reflect information of a complete event. Therefore, for other categories of text data, a text semantic unit may be flexibly designed. By taking a text semantic unit, instead of a word/phrase, as a basic processing unit, the text data may be better processed semantically, avoiding analyzing words/phrases with their semantic being segmented, and it also lays foundation for the replacement processing in the subsequent step S2.

In step S2, the text semantic unit(s) is replaced with a corresponding text keyword, based on a correspondence between text semantic elements and text keywords.

The text keyword is a keyword that is obtained in advance and may reflect the semantic of the text semantic unit. The text keyword may include one or more words or phrases in Chinese, one or more words or phrases in English, one or more words or phrases in other languages, etc.

The following operations are performed in advance: obtaining a plurality of text semantic units with a common semantic and their corresponding text keyword by clustering, and recording their correspondence, for example, in a mapping table, a codebook, a dictionary, or in other suitable forms. Hereinafter, a mapping table is taken as an example. The method of obtaining a mapping relationship is described in detail below with reference to FIG. 2.

In a case where the pre-obtained text semantic units with the corresponding text keyword are sufficient for the text data to which the text classification method 100 is applied, the text semantic unit in the mapping table, which is the same as the text semantic unit in the text data received in step S1, may be found based on the matching relationship. If the same text semantic unit cannot be found from the mapping table based on the matching relationship, the text semantic unit in the mapping table, which is most similar to the text semantic unit in the text data received in step S1, may be found based on similarities between the text semantic units in the mapping table and the text semantic units in the text data, as the corresponding text semantic unit. The text semantic unit is text, and all of the implementations in the prior art, such as a similarity calculation method based on a cosine angle of eigenvectors, may be used to calculate similarities between the text.

When the corresponding text semantic unit in the mapping table for the text semantic unit in the text data received in step S1 is found according to the matching relationship or similarities, the text semantic unit in the text data received in step S1 is replaced with the text keyword in the mapping table corresponding to the text semantic unit in the mapping table. In this way, the text data is transformed from including the text semantic unit(s) to including the text keyword(s). By such generalization, a large number of text semantic units are converted into a limited number of text keywords, and are abstracted semantically, which may improve the accuracy of text classification, increase the classification speed, and reduce the complexity of the semantic model and the classification model.

Figure 2:
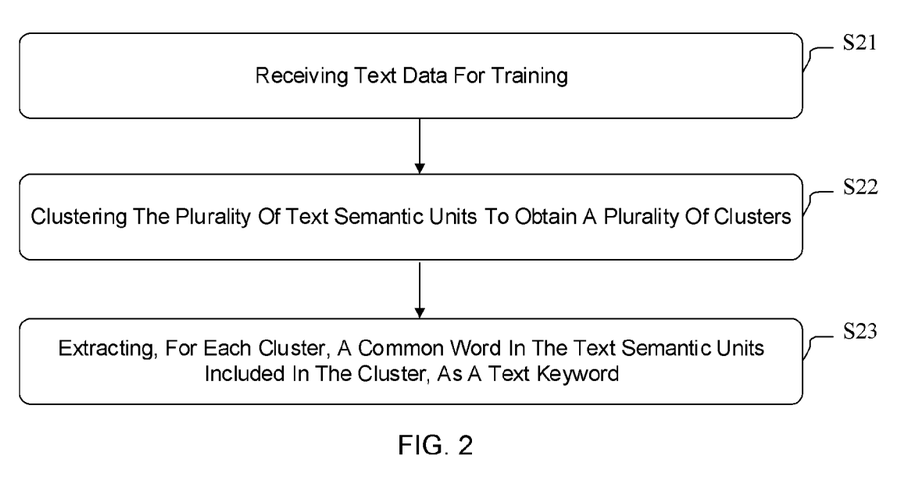
FIG. 2 illustrates a method 200 of acquiring a mapping relationship between a text semantic unit and a text keyword according to the present disclosure.

It may be seen from the clustering method as described in FIG. 2 that the acquisition of the correspondence between the text semantic unit and the text keyword in the mapping table is unsupervised. Therefore, the requirement for the quantity of labeled training data is reduced. The text semantic unit in the text data that can be processed by the text classification method 100 does not need the semantic model and the classification model of the present disclosure to have the same labeled text semantic unit as the training data. Therefore, the present disclosure has wider applicability and lower requirements on training data.

In step S3, a semantic feature of the text keyword is extracted with a semantic model.

The semantic model may extract a semantic feature of a processing object, including a topic model. The topic model may extract topics from the processing object from the perspective of the topic, and output a topic vector representing the distribution of the topics of the processing object. An example of the topic model includes an LDA (Latent Dirichlet allocation) model. The topic model may be generated during unsupervised training using unlabeled training text data, with only the number of topics being set in advance. Using the trained topic model, the semantic feature may be extracted from the text data consisting of the text keywords.

In step S4, the text keyword is classified with a classification model at least based on the semantic feature, as a classification result of the text data.

The classification model is trained in the following training process, and may be directly used for the classification in step S4. The feature based on which the classification model is applied is consistent with that during the classification model is being trained.

The classification model may be any of classification models in the prior art, such as a Support Vector Machine (SVM), a k-Nearest Neighbor (kNN), a logistic regression etc.

As one implementation, the classification model classifies the text keyword in the text data based on the semantic feature extracted in step S3, and the classification result is the classification result of the text data input in step S1.

As another implementation, the classification model may also be based on a temporal feature associated with the text semantic unit, in addition to the semantic feature. For example, in a scenario where the text data is a test log, the temporal feature includes an execution time length of a test case.

The features on which the classification model is based may also include other features, which may be flexibly designed according to the requirements and those skilled in the art.

All of the features used by the classification model are standardized by a feature standardizer. The feature standardizer standardizes the input feature, for example, specifies a value, a format of the feature, to facilitate the subsequent processing.

It may be seen from the following training process that the training data for the classification model is labeled with a classification result that the training data should be classified. However, the object processed by the classification model is also a text keyword, instead of a text semantic unit. Therefore, only a limited number of labeled training data is needed to train the classification model. However, the object processed by the classification model during the classification model is being applied may also include a text keyword that is converted from unlabeled text data (that is, text semantic units that have not been processed in the training). Therefore, the processing range of the classification model during the classification model is being applied is expanded to non-labeled text data, without affecting the classification accuracy. The reason is that the classification model is trained based on the text keyword, and the text keyword in the mapping table may correspond to either the text semantic unit(s) that have appeared during the training, or the text semantic unit(s) that have not appeared during the training.

The text classification method 100 according to the present disclosure may perform text classification in an efficient, high-accurate, robust and automatic manner. It is more efficient, accurate, and automatic than the manual classification methods; it is more accurate, robust, and widely applicable than the rule-based classification methods; and its requirement for the labeled training data is lower than other artificial intelligence classification methods. In the scenario where the text data is a test log, the text classification method according to the present disclosure may accurately label the test log lines by categories such as "Passed", "Failed", according to the requirements and the labels of corresponding training data, or accurately classify the test log lines into various error categories. Therefore, it is possible to easily identify the errors, synthesize an error message from the failed logs, locate an error log line, a specific category of error log line, a root-related line in a failed log, etc.

In FIG. 2, a method 200 for obtaining a mapping relationship between text semantic units and text keywords according to the present disclosure is shown.

In step S21, text data for training is received, the text data for training including a plurality of text semantic units.

The text data for training here does not need to be labeled, because it is not used for training the classification model, but only needs to extract semantic commonality from the text semantic units by unsupervised learning. The text data for training includes a plurality of text semantic units. The text data for training has been subjected to the preprocessing, such as word segmentation (if necessary), data cleaning, as described above.

In step S22, the plurality of text semantic units are clustered to obtain a plurality of clusters, each cluster including text semantic units with the same or similar semantic.

The purpose of the clustering is to abstract the text semantic units with the same or similar semantic into a common text keyword, so that the text semantic units are replaced by the text keyword. The clustering may be implemented by any of appropriate clustering methods in the prior art. A preferred clustering method is described below with reference to FIG. 3.

In step S23, for each cluster, a common word in the text semantic units included in the cluster is extracted as a text keyword corresponding to the text semantic units included in the cluster.

Since the text semantic units with the same or similar semantic have been clustered in step S22, a common word exhibiting commonality is extracted from the text semantic units with commonality in semantic as the text keyword in step S23. Therefore, the text keyword reflects the commonality between the corresponding text semantic units. The text keyword and all of the text semantic units in the corresponding cluster are stored into the mapping table for replacement with each other.

Traditional clustering methods often use a clustering center as a basis for subsequent processing. However, the present disclosure uses a common word as the basis for subsequent processing, which may ensure that the extracted common word, i.e., the text keyword, is readable, that is, is meaningful in semantic. After the text data received in step S1 is replaced with the text keyword, the replaced content is still meaningful and user-readable. This is helpful for better classification, and it is also facilitate to be provided to the user for further analysis.

If there is only one text semantic unit in a cluster, the common word is all of the text semantic unit, that is, the text keyword corresponding to the text semantic unit is the text semantic unit itself.

If there is no common word in all of the text semantic units included in a cluster, the cluster is divided into a plurality of sub-clusters, until the text semantic units included in the sub-cluster have a common word; and the common word is extracted as the text keyword corresponding to the text semantic units included in the sub-cluster.

The particular segmentation method is, for example, for each text semantic unit in the cluster, traversing the remaining text semantic units to find the text semantic unit(s) having a common word with the text semantic unit, and then forming a new sub-cluster with these text semantic units. The same processing is performed on the remaining text semantic units, until all of the text semantic units are traversed.

Figure 3:
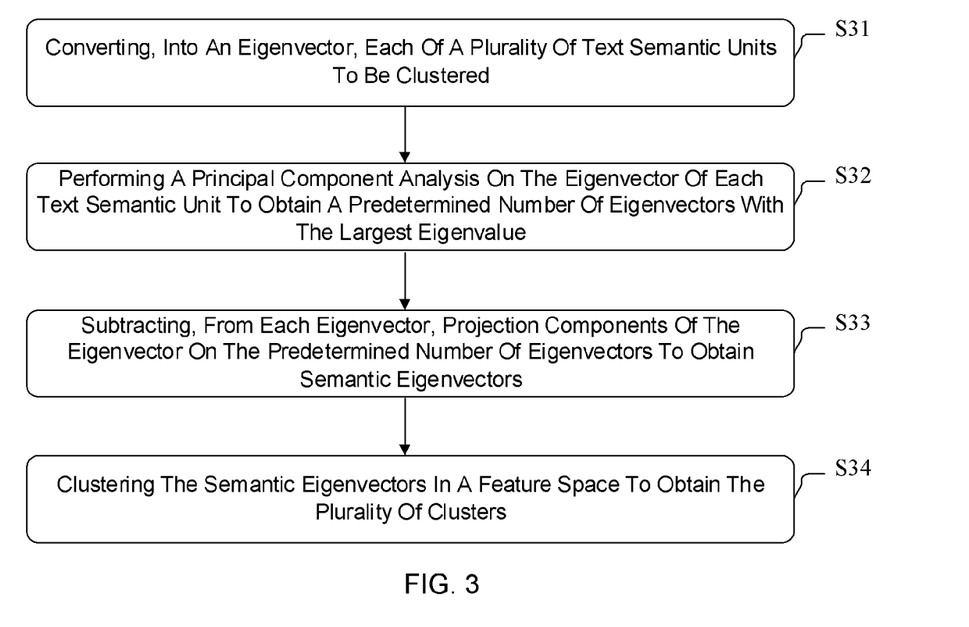
FIG. 3 illustrates a preferred method of performing semantic clustering on multiple text semantic units.

In FIG. 3, a preferred method for performing semantic clustering on a plurality of text semantic units is shown.

As shown in FIG. 3, in step S31, each of the plurality of text semantic units to be clustered is converted into an eigenvector.

For example, each word in the text semantic unit is converted into a vector using word2vec, and an eigenvector of the entire text semantic unit is obtained by summing the weighted vectors.

Specifically, for each text semantic unit, each of words constituting the text semantic unit is converted into a word eigenvector; an Inverse Document Frequency (IDF) for each word is calculated as a weight of the word, that is, the reciprocal of the number of times each word appears in different text semantic units is used as the weight of the word in this text semantic unit; and the weight of each word in the text semantic unit is normalized; based on the normalized weight of each word, all of the word eigenvectors for the text semantic unit are weighted summed to obtain the eigenvector corresponding to the text semantic unit.

In step S32, a principal component analysis is performed on the eigenvector of each text semantic unit to obtain a predetermined number of eigenvectors with the largest eigenvalue.

Principal Component Analysis (PCA) combines potentially correlated high-dimensional variables into linearly independent low-dimensional variables, called principal components. PCA essentially takes the direction at which a variance is largest as the principal feature, and "dis-correlates" the data in respective orthogonal directions, that is, makes the data uncorrelated in different orthogonal directions. SVD singular value decomposition may be used as an example of the PCA implementation. The PCA may be used herein to remove some noise in the data.

The predetermined number may be specified by those skilled in the art as needed.

In step S33, projection components of each eigenvector on the predetermined number of eigenvectors are subtracted from the eigenvector to obtain semantic eigenvectors.

The first few principal components with the largest eigenvalues are usually uncorrelated to the essential attributes of the data, and removing them will greatly improve the accuracy of the algorithm. For example, in the scenario where the text data is test data, the principal components with the largest eigenvalues are usually only correlated to stop words, grammar, etc., but uncorrelated to the semantics of the test log lines, and removing them is very helpful to retain and highlight the meanings of the test log lines, removing the false and keep the truth, and helping to improve the accuracy of the algorithm.

In step S34, the semantic eigenvectors are clustered in the feature space to obtain the plurality of clusters.

By converting the text semantic unit into the eigenvector, and removing noise through the principal component analysis, the obtained semantic eigenvector may reflect the semantic attribute of the text semantic unit. Therefore, in the feature space, clustering the semantic eigenvectors to obtain the plurality of clusters constituted by text semantic units with the same or similar semantics.

Figure 4:
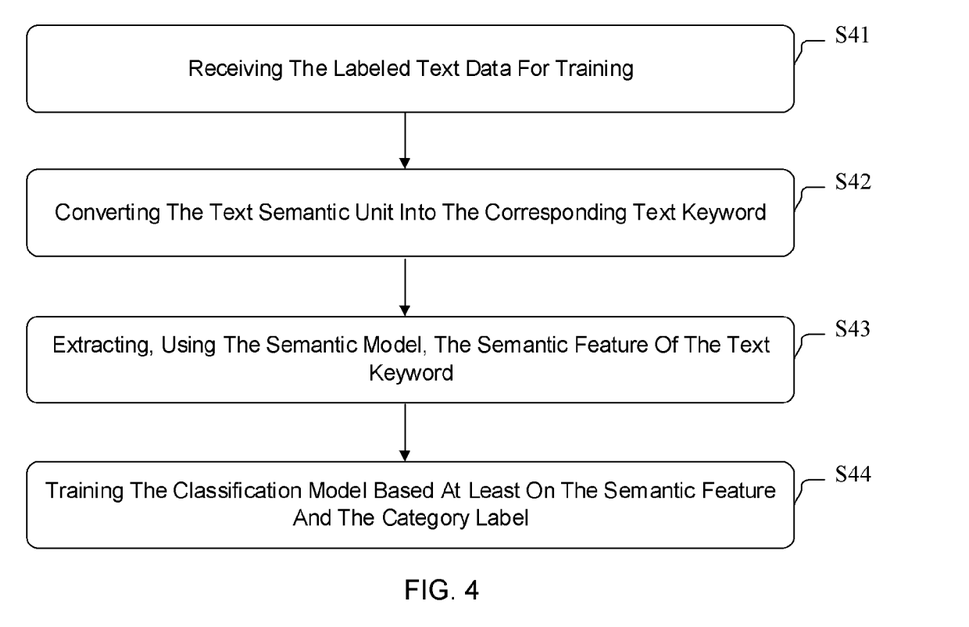
FIG. 4 illustrates a method of training a classification model.

In FIG. 4, a method for training a classification model is shown.

As shown in FIG. 4, in step S41, text data for training is received, the text data for training including a plurality of text semantic units and category labels thereof.

Note that the training data used to train the classification model is labeled with a category into which the corresponding text semantic unit should be classified. For example, in the scenario where the text data is a test log, the test log may be classified into categories such as "Passed", "Failed", or in the case where the text data is a "Failed" test log, the test log may be classified by error categories.

In step S42, the text semantic units are replaced with the corresponding text keyword based on the correspondence between text semantic units and text keywords.

This step is similar to the above step S2, the description of which will thus not be repeated here.

In step S43, the semantic feature of the text keyword is extracted with the semantic model.

This step is similar to the above step S3, the description of which will thus not be repeated here.

In step S44, the classification model is trained at least based on the semantic features and the category labels.

As described above, the classification model may also be trained based on the semantic features, and the temporal features associated with text data for training. The classification model may also be trained based on the semantic features and other appropriate features.

The features used for training the classification model are also standardized by the feature standardizer.

Hereinafter, a text classification device 500 according to an embodiment of the present disclosure will be described with reference to FIG. 5.

Figure 5:
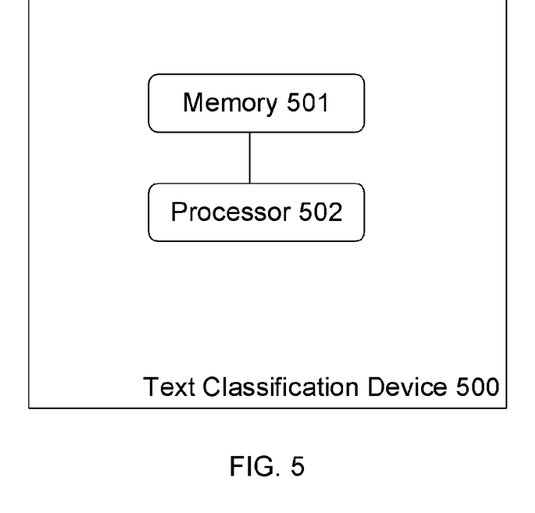
FIG. 5 illustrates a structural block diagram of a text classification device 500 according to an embodiment of the present disclosure.

FIG. 5 illustrates a structural block diagram of a text classification device 500 according to an embodiment of the present disclosure. As shown in FIG. 5, the text classification device 500 according to the present disclosure comprises: a memory 501 having instructions stored thereon; and a processor 502 coupled to the memory 501, wherein the instructions stored on the memory 501, when executed by the processor 502, cause the processor 502 to: receive text data, the text data comprising one or more text semantic units; replace the text semantic unit with a corresponding text keyword, based on a correspondence between text semantic elements and text keywords; extract, with a semantic model, a semantic feature of the text keyword; and classify, with a classification model, the text keyword at least based on the semantic feature, as a classification result of the text data.

In one embodiment, the instructions, when executed by the processor, further cause the processor to classify further based on a temporal feature associated with the text semantic unit.

In one embodiment, the instructions, when executed by the processor, further cause the processor to standardize the feature utilized in the classifying.

In one embodiment, the instructions, when executed by the processor, further cause the processor to train the classification model by: receiving text data for training, the text data for training comprising a plurality of text semantic units and category labels thereof; replacing the text semantic units with corresponding text keywords, based on the correspondence between text semantic units and text keywords; extracting, with the semantic model, the semantic features of the text keywords; and training the classification model at least based on the semantic features and the category labels.

In one embodiment, the instructions, when executed by the processor, further cause the processor to train the classification model further based on a temporal feature associated with the text data for training.

In one embodiment, the instructions, when executed by the processor, further cause the processor to standardize the feature used in the training.

In one embodiment, the instructions, when executed by the processor, further cause the processor to obtain the correspondence between the text semantic unit and the text keyword by: receiving text data for training, the text data for training comprising a plurality of text semantic units; clustering the plurality of text semantic units to obtain a plurality of clusters, each cluster comprising text semantic units with a same or similar semantic; and extracting, for each cluster, a common word in the text semantic units comprised in the cluster as a text keyword corresponding to the text semantic units comprised in the cluster.

In an embodiment, the instructions, when executed by the processor, further cause the processor to: in a case where there is no common word in the text semantic units comprised in the cluster, obtain the correspondence between text semantic units and text keywords by: dividing the cluster into a plurality of sub-clusters, until the text semantic units comprised in the sub-cluster have a common word; and extracting the common word as the text keyword corresponding to the text semantic units comprised in the sub-cluster.

In one embodiment, the instructions, when executed by the processor, further cause the processor to perform semantic clustering on the plurality of text semantic units by: converting each text semantic unit into an eigenvector; performing a principal component analysis on the eigenvector to obtain a predetermined number of eigenvectors with a largest eigenvalue; subtracting, from each eigenvector, projection components of the eigenvector on the predetermined number of eigenvectors to obtain semantic eigenvectors; and clustering the semantic eigenvectors in a feature space to obtain the plurality of clusters.

In an embodiment, the instructions, when executed by the processor, further cause the processor to convert each text semantic unit into the eigenvector by: for each text semantic unit, converting each of words constituting the text semantic unit into a word eigenvector; calculating an Inverse Document Frequency (IDF) for each word as a weight of the word, and normalizing the weight of each word for the text semantic unit; weighted summing all word eigenvectors for the text semantic unit based on the normalized weight of each word, to obtain the eigenvector corresponding to the text semantic unit.

In one embodiment, the instructions, when executed by the processor, further cause the processor to perform data cleaning on the text data to remove a word irrelevant to a semantic of the text data.

In one embodiment, the text comprises a test log, the text semantic unit comprises a log line, and the log line comprises one or more sentences.

In an embodiment, the instructions, when executed by the processor, further cause the processor to further perform a word segmentation before the data cleaning in a case where the text data is Chinese.

Figure 6:
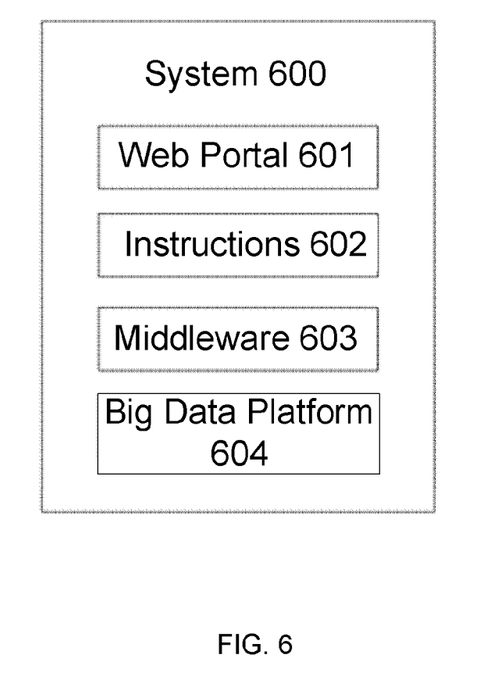
FIG. 6 illustrates a schematic structure diagram of a system 600.

The present disclosure may be implemented in a system 600 as shown in FIG. 6. As shown in FIG. 6, the system 600 includes a web portal 601, instructions 602 capable of implementing the text classification method 100, a middleware 603, and a big data platform 604.

The web portal 601 may be a graphical interface for visually displaying data such as text data, label data, a classification result, etc., or for labeling data.

The instructions 602 runs on the big data platform 604 to implement the text classification method 100 according to the present disclosure.

The middleware 603 is implemented in software, and is used to, for example, obtain, preprocess, store text data (such as a test log), trigger the execution of instructions 602, or return a classification result.

The big data platform 604 is a scalable platform for distributed file storage and distributed computing. The big data platform 604 may be implemented to include a distributed file system such as HDFS (Hadoop Distributed File System), a distributed computing framework such as spark, or a database such as HBase.

Figure 7:
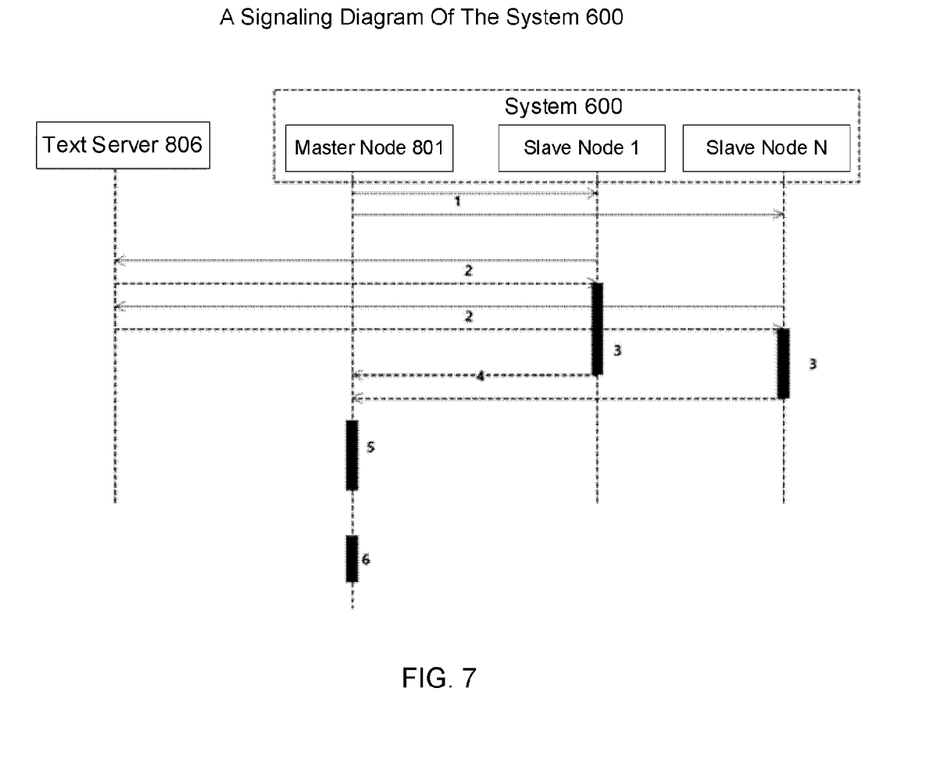
FIG. 7 illustrates a signaling diagram of the system 600.

FIG. 7 shows a signaling diagram of the system 600.

The system 600 includes a master node 801 and slave nodes 1 to n. Among them, n is a natural number greater than 1. Here, slave nodes 1 and n are shown only as examples, and the system 600 may include more slave nodes. The text server 806 is used to store and provide text to be classified.

For example, the signaling flow is:
1. The master node 801 initiating a request to at least one of the slave nodes 1 to n;
2. Each of the slave nodes that received the request obtaining the text to be classified from a text server 806;
3. Each of the slave nodes that received the request preprocessing the obtained text, the preprocessing including, but not limited to, Chinese word segmentation, data cleaning, conversion of the text into a specific format, etc.;
4. Each of the slave nodes that received the request writing the preprocessed text into a database, such as HBase;
5. The master node 801 executing the text classification method 100 of the present disclosure.
6. The master node 801 stores an output result of the text classification method 100 into a database, such as HBase.

In addition, it should be pointed out here that the program constituting the software of the text classification method 100 according to the present is installed from a storage or network to a computer with a dedicated hardware structure (such as the general computer 700 shown in FIG. 8), and the computer, when installed with various programs, may perform various functions, such as the text classification method 100.

Figure 8:
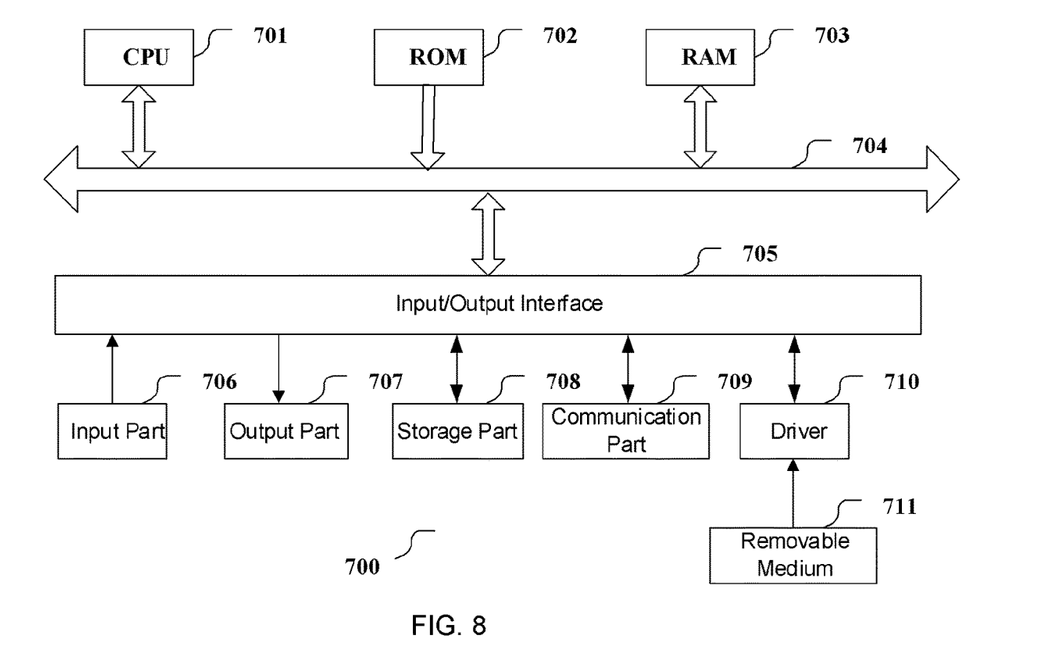
FIG. 8 illustrates a schematic block diagram of a computer that may be used to implement the method and the device according to an embodiment of the present disclosure.

FIG. 8 illustrates a schematic block diagram of a computer which may be used to implement the method and device according to an embodiment of the present disclosure.

In FIG. 8, a central processing unit (CPU) 701 performs various processing in accordance with programs stored in a read only memory (ROM) 702 or programs loaded from a storage section 708 to a random access memory (RAM) 703. Data required when CPU 701 performs various processing and the like is also stored in RAM 703 as necessary. CPU 701, ROM 702, and RAM 703 are connected to each other via a bus 704. The input/output interface 705 is also connected to the bus 704.

The following components are connected to the input/output interface 705: input section 706 (including a keyboard, a mouse, etc.), output section 707 (including a display, such as cathode ray tube (CRT), liquid crystal display (LCD), etc., and a speaker, etc.), storage section 708 (including hard disk, etc.), communication section 709 (including network interface card such as LAN card, modem, etc.). The communication section 709 performs communication processing via a network such as the Internet. The driver 710 may also be connected to the input/output interface 705 as needed. The removable media 711, such as a magnetic disk, an optical disk, a magneto-optical disk, a semiconductor memory, may be installed onto the driver 710 as needed, such that the computer program read therefrom are installed into the storage section 708 as needed.

In the case where the above series of processing is implemented by a software, a program constituting the software is installed from a network such as the Internet or a storage medium such as a removable medium 711.

Those skilled in the art should understand that this storage medium is not limited to the removable medium 711 where the program is stored and which is distributed separately from the device to provide the program to a user, as shown in FIG. 8. Examples of the removable medium 711 include a magnetic disk (including a floppy disk (registered trademarks)), an optical disk (including a compact disk read-only memory (CD-ROM) and a digital versatile disks (DVD)), a magneto-optical disk (including a mini disk (MD) (registered trademarks)) and a semiconductor memory. Alternatively, the storage medium may be the ROM 702, a hard disk contained in the storage section 708, etc., in which the programs is stored and which is distributed to the user along with the device containing it.

The present disclosure also proposes a program product storing machine-readable instruction codes. The instruction codes, when read and executed by a machine, cause to perform the above method according to embodiments of the present disclosure.

Accordingly, a storage medium for carrying the above-mentioned program product storing machine-readable instruction codes is also included in the disclosure of the present disclosure. The storage medium includes, but not limited to, a floppy disk, an optical disk, a magneto-optical disk, a memory card, a memory stick, etc.

In the above description of the specific embodiments of the present disclosure, features described and/or shown for one implementation may be used in one or more other implementations in the same or similar manner, combined with features in other implementations, or replace features in other implementations.

It should be emphasized that the term "comprising/including" when used herein refers to the existence of a feature, an element, a step or a component, but does not exclude the existence or addition of one or more other features, elements, steps or components.

In addition, the method of the present disclosure is not limited to being performed as the temporal order described in the specification, and may also be performed in sequence, in parallel or independently in time. Therefore, the order of performing the methods described in this specification does not limit the technical scope of the present disclosure.

Although the present disclosure has been disclosed above through the description of specific embodiments of the present disclosure, it should be understood that all of the above-mentioned embodiments and examples are illustrative rather than restrictive. Those skilled in the art may design various modifications, improvements or equivalents to the present disclosure within the spirit and scope of the appended claims. These modifications, improvements or equivalents should also be considered to be included in the protection scope of the present disclosure.

The invention claimed is:

1. A computer-implemented text classification method comprising:
   receiving text data comprising a test log from automatic testing of hardware and/or software, wherein the text data includes one or more text semantic units;
   replacing the one or more text semantic units with corresponding one or more text keywords, based on a correspondence between text semantic units and text keywords; and
   for each of the one or more text keywords:
      extracting a semantic feature of the text keyword using a semantic model; and
      classifying the text keyword based on the extracted semantic feature and a classification model, thereby obtaining a classification result of the text data, wherein the classification result indicates or identifies one or more of the following:
         whether the automatic testing passed or failed, and
         when the automatic testing failed, one or more errors in the test log.

2. The text classification method of claim 1, wherein classifying the text keyword is further based on a temporal feature associated with the text semantic unit.

3. The text classification method of claim 1, wherein each semantic feature, on which classifying the text keyword is based, has one or more of the following characteristics specified by a feature standardizer: value, and format.

4. The text classification method of claim 1, further comprising training the classification model by performing at least the following operations:
   receiving text data for training, the text data for training comprising one or more test logs from automatic testing of hardware and/or software, wherein the text data for training includes a plurality of text semantic units and associated category labels, wherein the category labels indicate or identify one or more of the following:
      whether the automatic testing passed or failed, and
      when the automatic testing failed, one or more errors in the test log;
   replacing the plurality of text semantic units with a corresponding plurality of text keywords, based on the correspondence between text semantic units and text keywords;
   extracting semantic features of the plurality of text keywords using the semantic model; and
   training the classification model based on the extracted semantic features and the category labels associated with the text semantic units.

5. The text classification method of claim 4, wherein training the classification model is further based on a temporal feature associated with the text data for training.

6. The text classification method of claim 4, wherein each semantic feature, on which training the classification model is based, has one or more of the following characteristics specified by a feature standardizer: value, and format.

7. The text classification method of claim 1, further comprising obtaining the correspondence between text semantic units and text keywords by performing at least the following operations:

receiving text data for training, the text data for training comprising one or more test logs from automatic testing of hardware and/or software, wherein the text data for training includes a plurality of text semantic units;

clustering the plurality of text semantic units to obtain a plurality of clusters, wherein each cluster includes text semantic units with a same or similar semantic; and for each cluster, based on identifying a common word in the text semantic units included in the cluster, assigning the identified common word as a text keyword corresponding to the text semantic units included in the cluster.

8. The text classification method of claim 7, wherein obtaining the correspondence between text semantic units and text keywords further comprises, for each cluster, based on identifying no common word in the text semantic units included in the cluster, performing the following operations:

dividing the cluster into a plurality of sub-clusters, until a common word is identified in the text semantic units included in a sub-cluster; and assigning the identified common word as a text keyword corresponding to the text semantic units included in the sub-cluster.

9. The text classification method of claim 7, wherein clustering the plurality of text semantic units comprises:

converting each text semantic unit into a corresponding eigenvector;

for each eigenvector corresponding to a text semantic unit:

performing a principal component analysis on the eigenvector to obtain a predetermined number of eigenvectors having largest eigenvalues, and subtracting projection components of the eigenvector on the predetermined number of eigenvectors to obtain semantic eigenvectors; and clustering the semantic eigenvectors, obtained for the plurality of text semantic units, in a feature space to obtain the plurality of clusters.

10. The text classification method of claim 9, wherein converting each text semantic unit into an eigenvector comprises:

for each word comprising the text semantic unit,
converting the word into a corresponding word eigenvector, and
calculating an Inverse Document Frequency (IDF) for the word as a word weight of the word;

normalizing the word weights of the words comprising the text semantic unit; and obtaining the eigenvector corresponding to the text semantic unit based on weighted summing the word eigenvectors for the text semantic unit based on the normalized word weights.

11. The text classification method of claim 1, further comprising performing data cleaning on the text data to remove a word irrelevant to a semantic of the text data.

12. The text classification method of claim 1, wherein:
the one or more text semantic units comprise respective lines of the test log, and
each line of the test log includes one or more complete sentences.

13. The text classification method of claim 11, further comprising performing word segmentation on Chinese text data to obtain the text data on which the data cleaning is performed.

14. A text classification device comprising:
a memory having instructions stored thereon; and
a processor operably coupled to the memory, wherein execution of the instructions by the processor cause the text classification device to perform operations corresponding to the method of claim 1.

* * * * *